United States Patent
Fujisawa

(10) Patent No.: US 6,388,971 B2
(45) Date of Patent: *May 14, 2002

(54) DISC RECORDING AND/OR REPRODUCING APPARATUS AND DISC REPRODUCING APPARATUS

(75) Inventor: Hirotoshi Fujisawa, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/798,277

(22) Filed: Feb. 14, 1997

(30) Foreign Application Priority Data

Feb. 16, 1996 (JP) .............................. 8-029768

(51) Int. Cl.⁷ .............................. G11B 33/02
(52) U.S. Cl. .................................... 369/75.2
(58) Field of Search ........................ 369/13, 36, 75.1, 369/75.2, 77.1, 77.2

(56) References Cited

U.S. PATENT DOCUMENTS

| | | | | |
|---|---|---|---|---|
| 4,823,213 A | * | 4/1989 | Naruki | 360/78.12 |
| 4,866,693 A | * | 9/1989 | Odawara et al. | 369/75.2 |
| 4,890,276 A | * | 12/1989 | Ono et al. | 369/77.2 |
| 5,220,543 A | * | 6/1993 | Kuroda et al. | 369/13 |
| 5,226,024 A | * | 7/1993 | Mukawa | 369/13 |
| 5,265,083 A | * | 11/1993 | Ishii et al. | 369/75.2 |
| 5,309,421 A | * | 5/1994 | Fujisawa | 369/77.1 |
| 5,355,357 A | * | 10/1994 | Yamamori et al. | 369/75.2 |
| 5,400,198 A | * | 3/1995 | Suzuki et al. | 360/99.06 |
| 5,541,809 A | * | 7/1996 | Kakizaki et al. | 361/683 |
| 5,737,304 A | * | 4/1998 | Soga et al. | 369/247 |
| 5,768,237 A | * | 6/1998 | Kanada et al. | 369/75.1 |

* cited by examiner

Primary Examiner—Brian E. Miller
Assistant Examiner—Tod Kupstas
(74) Attorney, Agent, or Firm—Oblon, Spivak, McClelland, Maier & Neustadt, P.C.

(57) ABSTRACT

A disc recording and/or reproducing apparatus, employing a disc cartridge housing a disc with a diameter of approximately 64 mm, small enough to be placed in a user's pocket for easy transportation. The disc recording and/or reproducing apparatus has a spindle motor and optical pickup device mounted such that a surface of the spindle motor and the pickup is fitted into the base to reduce the thickness of the apparatus.

13 Claims, 7 Drawing Sheets

DISC RECORDING AND/OR REPRODUCING APPARATUS AND DISC REPRODUCING APPARATUS

BACKGROUND OF THE INVENTION

1. Field of the Invention

This invention relates to a disc recording and/or reproducing apparatus and a disc reproducing apparatus. More particularly, it relates to a disc recording and/or reproducing apparatus for recording/reproducing information signals on or from the disc, and a disc reproducing apparatus.

2. Description of the Related Art

So far, in a disc recording and/or reproducing apparatus employing a disc as a recording medium and configured for reproducing information signals recorded on the disc, it has been widely practiced to employ a cell (battery) housed within a casing main body portion as a power source for utilization of the apparatus as a portable type apparatus.

Since the information signals can be recorded to a high recording density on an optical disc, attempts are being made for reducing the disc size further. For example, there has been proposed and used an optical disc 64 mm in diameter capable of recording the information up to 74 minutes at the maximum in case the information signals are music signals. The disc recording and/or reproducing apparatus, employing such small-sized optical disc as a recording medium, is reduced to a small size such that it can be contained in the user's pockets for transportation.

The disc recording and/or reproducing apparatus, employing such small-sized optical disc as a recording medium, is required to be reduced in size so as to be contained and carried in the user's pockets.

SUMMARY OF THE INVENTION

It is therefore an object of the present invention to provide a disc recording and/or reproducing apparatus which resolves the above-mentioned problem.

It is another object of the present invention to provide a disc reproducing apparatus which resolves the above-mentioned problem.

According to the present invention, there is provided a disc reproducing apparatus employing a disc cartridge housing a disc having a diameter approximately equal to 64 mm. The disc cartridge has an aperture for exposing the disc to outside. The disc reproducing apparatus includes a base, a cartridge holder, a rotational driving unit, a pickup feed motor, a pickup and a feed unit. The base is a metallic plate having a cut-out of substantially the same size as the aperture in the disc cartridge. The cartridge holder is rotatably supported on one surface of the base. The cartridge holder is rotated between a first position spaced apart from the base and a second position proximate to the base. The cartridge holder holds the disc cartridge. The rotational driving unit rotationally drives the disc in the disc cartridge held by the cartridge holder when the holder is in the second position. The rotational driving unit has a disc table arranged for being protruded from one surface of the base and on which is set the disc within the disc cartridge held by the holder when the holder is in the second position, and a spindle motor arranged on the opposite surface of the base for rotationally driving the disc table. The disc table is mounted on a rotational shaft of the spindle motor. The pickup feed motor is arranged on the opposite surface of the base. The feed motor is arranged on the base so that the rotational shaft of the feed motor will be substantially parallel to that of the spindle motor. The pickup is arranged for being at least partially intruded into the cut-out formed in the base and is moved in the cut-out along the radius of the disc housed within the disc cartridge. The feed unit moves the pickup radially of the disc based on the driving power from the pickup feed motor. The feed unit is arranged on the opposite surface of the base and has a feed screw meshing with the pickup for moving the pickup radially of the disc.

According to the present invention, there is also provided a disc reproducing apparatus employing a disc cartridge housing a disc and an aperture for exposing the disc to outside. The disc reproducing apparatus includes a base, a cartridge holder, a rotational driving unit, a pickup feed motor, a pickup and a feed unit. The base is a metallic plate having a cut-out of substantially the same size as the aperture in the disc cartridge. The cartridge holder is rotatably supported on one surface of the base. The cartridge holder is rotated between a first position spaced apart from the base and a second position proximate to the base. The cartridge holder holds the disc cartridge. The rotational driving unit rotationally drives the disc in the disc cartridge held by the cartridge holder when the holder is in the second position. The rotational driving unit has a disc table arranged for being protruded from the one surface of the base and on which is set the disc within the disc cartridge held by the holder when the holder is in the second position, and a spindle motor arranged on the opposite surface of the base for rotationally driving the disc table. The disc table is mounted on a rotational shaft of the spindle motor. The pickup feed motor is arranged on the opposite surface of the base. The feed motor is arranged on the base so that the rotational shaft of the feed motor will be substantially parallel to that of the spindle motor. The pickup is arranged for being at least partially intruded into the cut-out formed in the base and is moved in the cut-out along the radius of the disc housed within the disc cartridge. The feed unit moves the pickup radially of the disc based on the driving power from the pickup feed motor. The feed unit is arranged on the opposite surface of the base and has a feed screw meshing with the pickup for moving the pickup radially of the disc.

DESCRIPTION OF THE PREFERRED EMBODIMENTS

Figure 1:
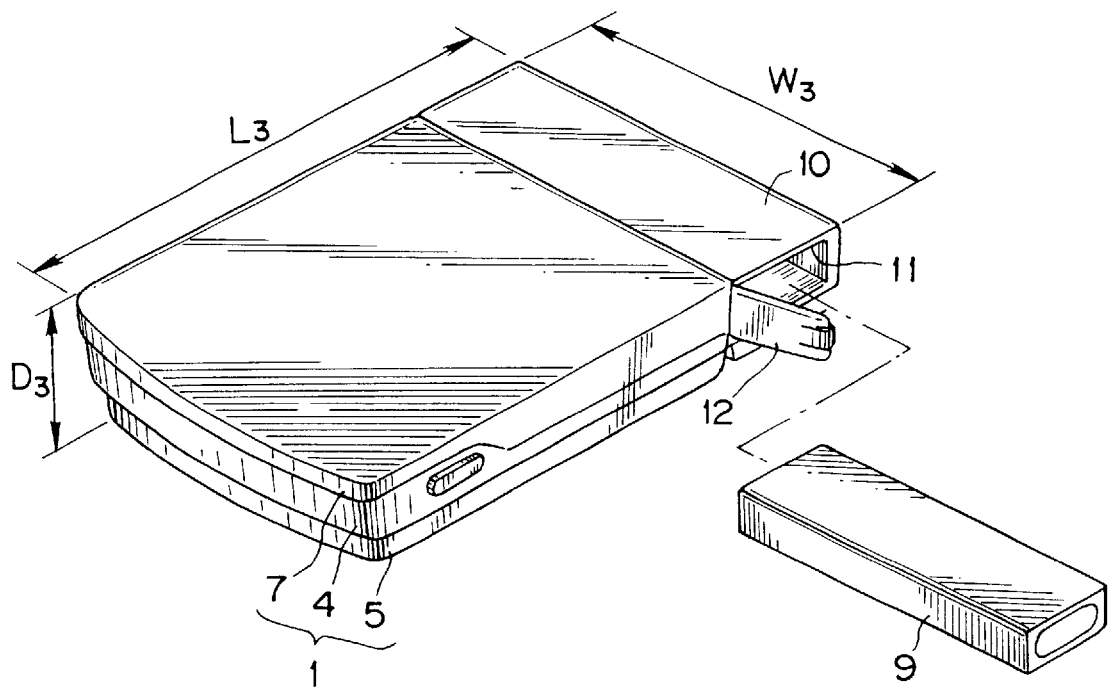
FIG. 1 is an overall perspective view showing a disc player according to the present invention.

Referring to the drawings, an embodiment in which a disc recording and/or reproducing apparatus according to the present invention is applied to a disc player configured for reproducing information signals recorded on an optical disc is hereinafter explained.

Figure 2:
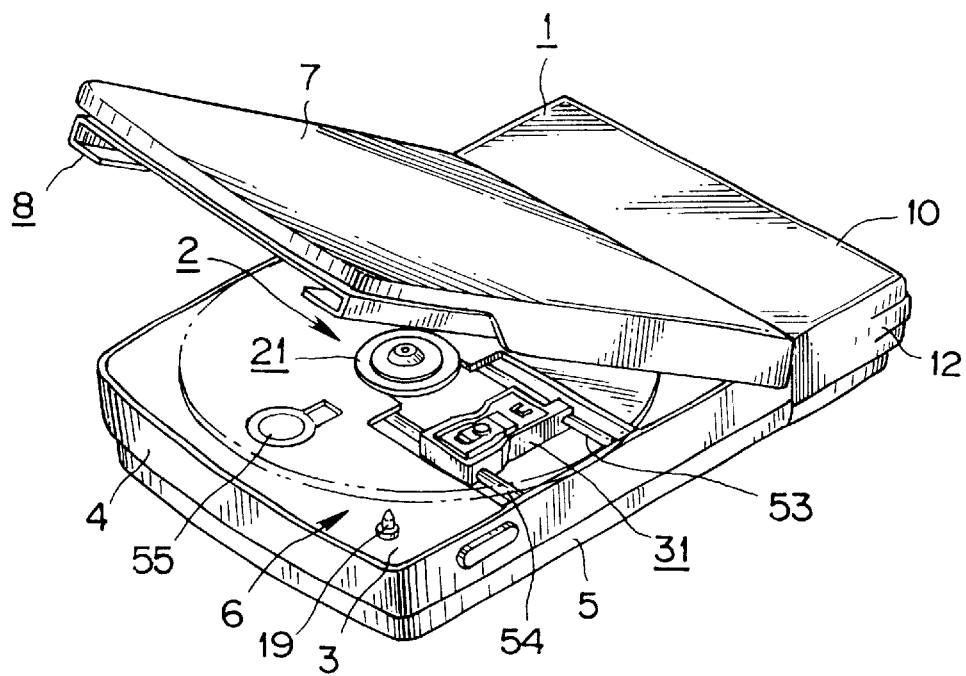
FIG. 2 is a perspective view of a disc player showing the disc player having a lid opened.

The disc player includes a casing 1 making up a main body portion of the player of a portable size, and a base 3 mounted in the casing 1 for mounting a player unit 2 thereon, as shown in FIGS. 1 and 2. The casing 1 is made up of a main casing body portion 4, formed as a rectangular frame for housing the base 3 therein, a bottom plate 5 mounted in the main casing body portion 4 for covering the opened bottom side of the main casing body portion 4 and a lid 7 mounted on the main casing body portion 4 for opening/closing a cartridge loading portion 6 formed on an upper side of the base 3 housed within the main casing body portion 4. The lid 7 is mounted via base 3 for rotation between a closure position of closing the cartridge loading portion 6 as shown in FIG. 1 and an opening position of opening the cartridge loading portion 6 as shown in FIG. 2. In the closure position, the lid 7 closes the cartridge loading portion 6 in synchronism with a cartridge holder 8 adapted for holding the disc cartridge for loading/unloading the disc cartridge on or from the cartridge loading portion 6. On the back side of the main casing body portion 4, on which is fulcrumed the lid 7, is formed a cell housing unit 10 for housing a rectangular secondary cell 9. The surface of the cell housing unit 10 facing a lateral side of the main casing body portion 4 is formed with an insertion/ejection opening 11 for the cell 9. This opening 11 is closed by an opening/closure lid 12 rotatably mounted via base 3.

Figure 3:
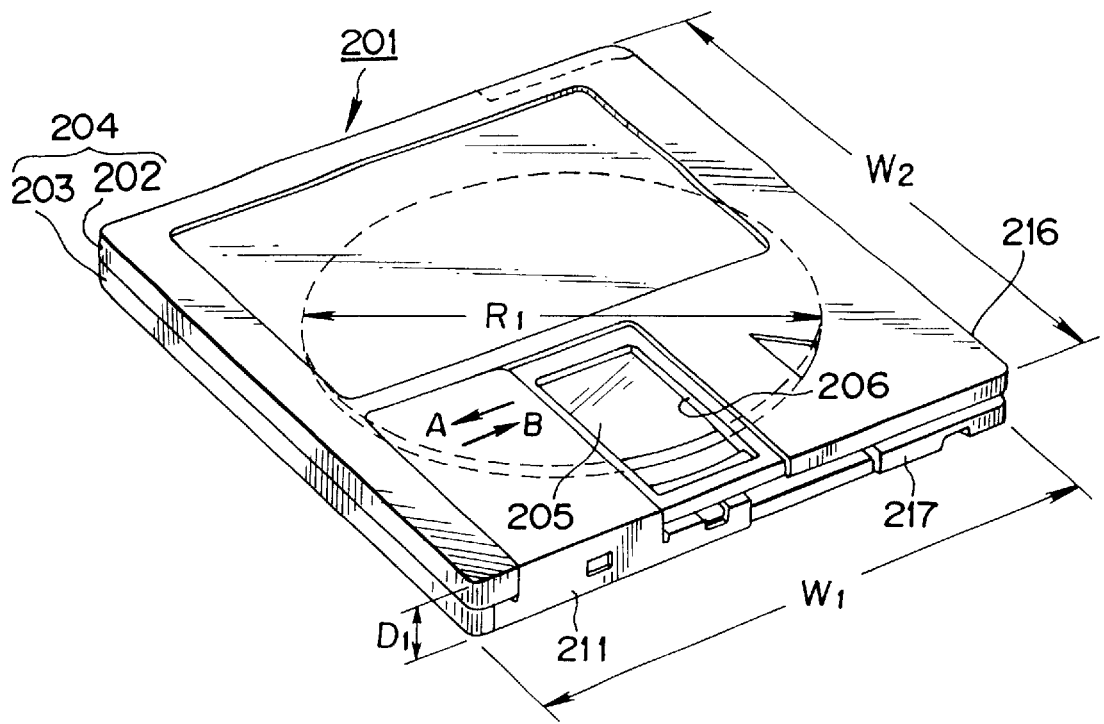
FIG. 3 is a perspective view, as seen from an upper side, of a disc cartridge employed in a disc player according to the present invention.
Figure 4:
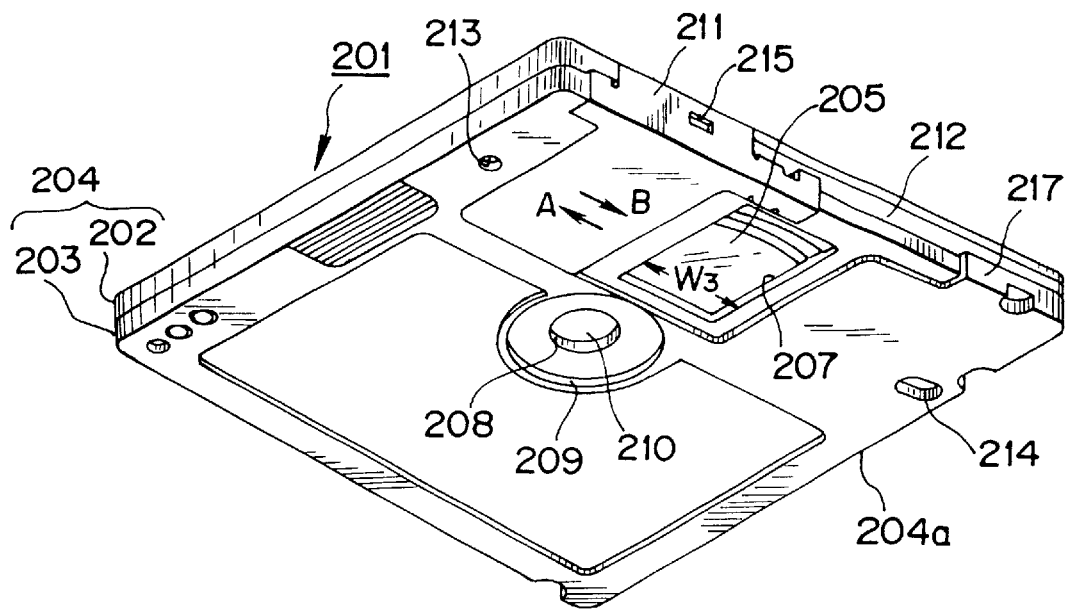
FIG. 4 is a perspective view, as seen from a lower side, of the disc cartridge employed in a disc player according to the present invention.

A disc cartridge 201 employed in the disc player according to the present invention is now explained. The disc cartridge 201 has a main cartridge body portion 204, made up of an upper cartridge half 202 and a lower cartridge half 203 abutted and connected to each other, as shown in FIGS. 3 and 4. Within this cartridge main body portion 204 is rotatably housed an optical disc 205, approximately 64 mm in diameter R1, configured for recording music signals of up to 74 minutes at the maximum.

In the upper and lower surfaces of the main cartridge body portion 204 are formed recording and/or reproducing apertures 206, 207 configured for exposing part of the signal recording area of the optical disc 205 housed therein. These apertures 206, 207 are formed at a mid position in the left-and-right direction of the main cartridge body portion 204 for extending from near the center to near the front side thereof. The aperture 207 formed in the upper side of the cartridge main body portion 204 is faced by an optical pickup device designed for recording and/or reproducing information signals on or from the optical disc 205, while the aperture 206 formed in the lower side of the cartridge main body portion 204 is faced by a magnetic head designed for impressing an external magnetic field for recording information signals on the optical disc 205 in cooperation with the optical pickup device. The optical disc Z05 is a magneto-optical disc, having a photomagnetic recording layer, and which is housed within the cartridge main body portion 204.

The mid portion on the lower surface of the cartridge main body portion 204 is formed with a center aperture 209 for exposing the inner peripheral rim of the optical disc 205 inclusive of the center aperture 208 to outside of the cartridge main body portion 204. Into this center aperture 209 is intruded a disc table of a disc rotational driving unit of the disc recording and/or reproducing apparatus configured for rotating the optical disc 205 housed within the cartridge main body portion 204.

At a mid portion of the optical disc 205 is mounted a metallic plate 210 for overlying the center aperture 208. When the optical disc 205 is set on the disc table, the metallic plate 210 is attracted by a magnet provided on the disc table towards the disc table. This causes the metallic plate 210 to be clamped by and rotated in unison with the disc table.

On the main cartridge body portion 204 is mounted a shutter 211 configured for opening or closing the apertures 206, 207. The shutter 211 is formed by bending a thin metallic plate or molding a synthetic resin material in the form of a letter U in cross-section and is movably mounted on the main cartridge body portion 204 from its front side for overlying the apertures 206, 207 from outside. That is, the shutter 211 is moved between a position of closing the apertures 206, 207 and a position of opening the apertures in a direction indicated by arrow A and in a direction indicated by arrow B in FIGS. 3 and 4.

The disc cartridge 201 is loaded on the disc recording and/or reproducing apparatus with a lateral side 216 of the disc cartridge 201 lying at right angles with the front side thereof, along which is moved the shutter 211, as the inserting side. A shutter opening member, not shown, provided on the disc recording and/or reproducing apparatus, is then engaged in a shutter movement guide groove 212 formed in a front side 217 of the main cartridge body portion 204 for unlocking the shutter 211 so far locked in the position of closing the apertures 206, 207 for moving the shutter 211 relative to the main cartridge body portion 204 for opening the apertures 206, 207.

The disc cartridge 201 used in the disc player according to the present invention is sized so as to be large enough to accommodate a small-sized optical disc 205 approximately 64 mm in diameter, and is shaped substantially as a rectangle having a width W1 of the front side 217 for carrying the shutter 211 of 68 mm, a width W2 of a lateral side 216 operating as the inserting side of 72 mm and a thickness D1 of 5 mm, as shown in FIG. 3.

With the disc player according to the present invention, not only the disc cartridge 201 enabling the recording of the information signals as described above but also a read-only disc cartridge having housed therein an optical disc carrying pre-recorded information signals, such as music signals, may be employed. This read-only disc cartridge has a size in common with the above-described recording/reproducing disc cartridge 201. However, the read-only disc cartridge is not in need of an aperture faced by the magnetic head used for recording the information signals and hence the upper side of the main cartridge body portion is closed. Since there is no aperture in the upper surface of the read-only disc cartridge, the shutter mounted thereon is a single surface type configured for closing only the aperture in the lower surface of the disc cartridge.

Figure 5:
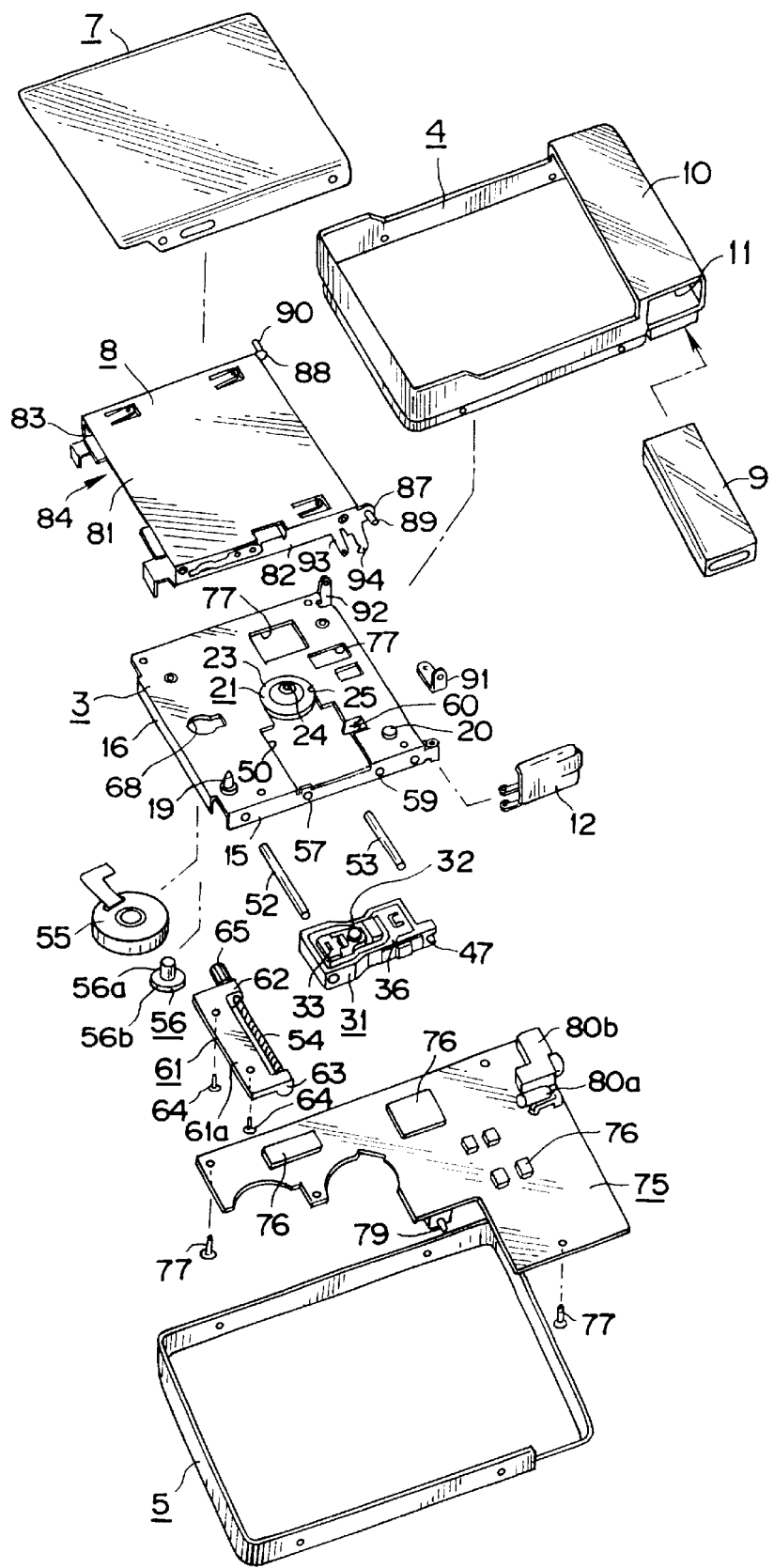
FIG. 5 is an exploded perspective view of the disc player according to the present invention.

The disc player according to the present invention, employing the above-described disc cartridge 201 as a recording medium, has the base 3 within the casing 1 for mounting the player unit 2 thereon. This base 3 is formed by punching a thin metallic plate and bending the punched piece into a rectangular shape, as shown in FIGS. 5 and 6.

On opposite lateral sides of the base 3 are formed a pair of side wall sections 14, 15 for depending in a direction at right angles with its major surface. On the front and back sides of the base 3 are formed a front side wall section 16 and a back side wall section 17, respectively, by warping for depending in a direction at right angles with the major surface of the base 3. Since the base 3 is formed in this manner with the side wall sections 14, 15, front wall section 16 and the back wall section 17 by warping the edge portions thereof, sufficient toughness of the base 3 is assured for assembling the player unit 2 thereon. The bottom side of the base 3 surrounded by the sidewall sections 14, 15, front wall section 16 and the back wall section 17 delimits a spacing for accommodating mechanical parts making up the player unit 2, as later explained.

On the upper surface of the base 3 is arranged the above-mentioned cartridge loading unit 6 for loading the disc cartridge 201 loaded on the present disc player. The cartridge loading unit 6 has positioning pins 19, 20 adapted for being engaged in portioning holes 213, 214 formed on both lateral sides of the aperture 207 formed in the lower surface of the disc cartridge 201 for setting the loading position of the disc cartridge 201 in the horizontal and vertical directions of the disc cartridge 201. These positioning pins 19, 20 are mounted on the base 3 such as by caulking. The base 3, having the cartridge loading unit 6 on its upper surface, has a rectangular planar shape substantially coextensive as the planar shape of the disc cartridge 201 loaded on the disc player.

Figure 6:
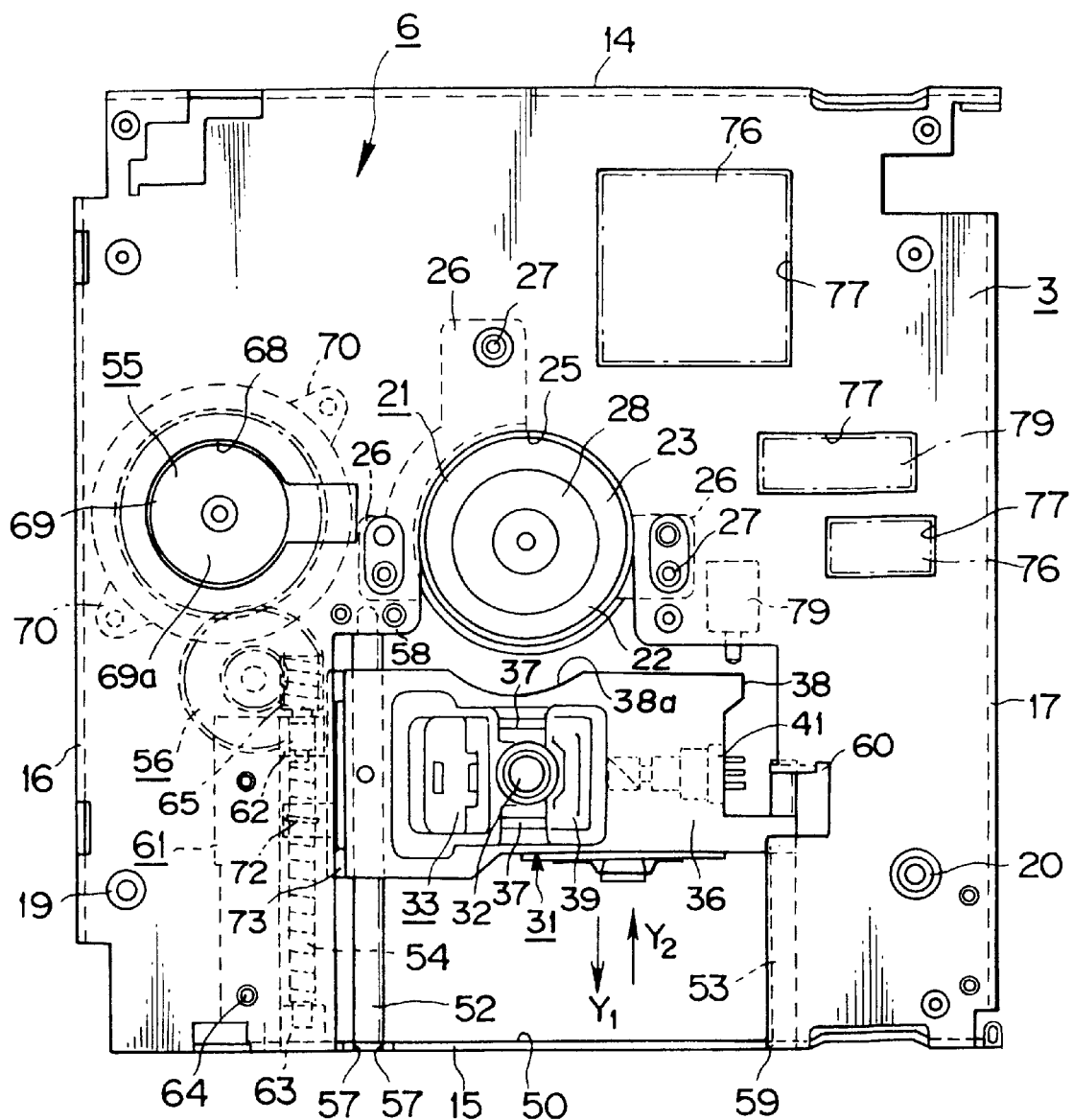
FIG. 6 is a plan view showing a layer portion of the disc player.
Figure 7:
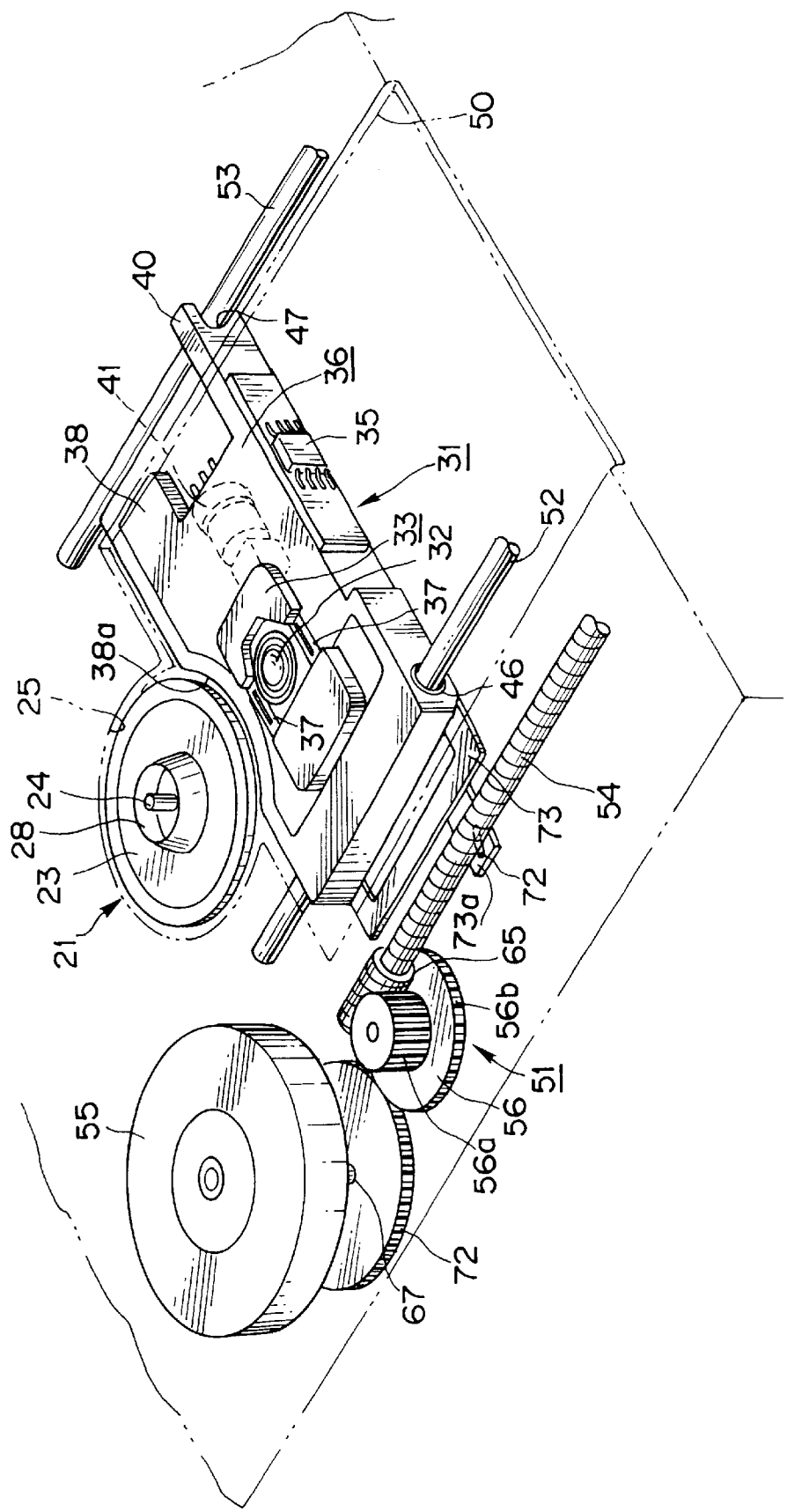
FIG. 7 is a perspective view showing an optical pickup device and a feed unit thereof.
Figure 8:
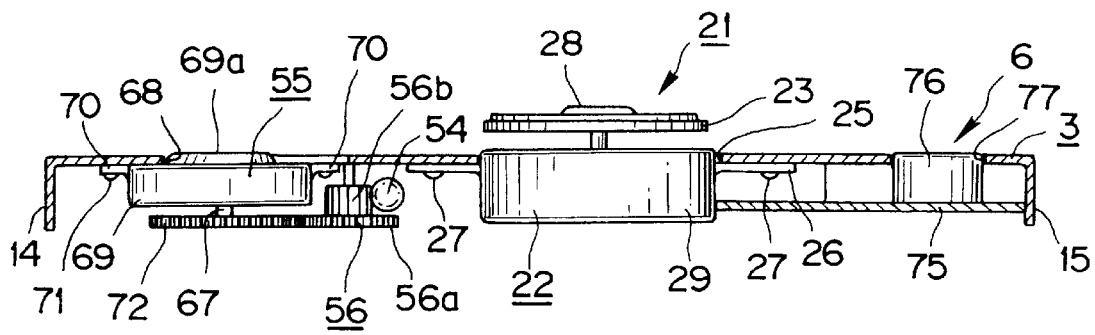
FIG. 8 is a cross-sectional view showing a disc rogation unit and the feed unit for the optical pickup device.

At a mid portion of the base 3 is arranged a disc rotational driving unit 21 for rotating the optical disc 205 housed within the disc cartridge 201 loaded on the disc player, as shown in FIGS. 6 and 7. The disc rotation driving unit 21 is made up of a spindle motor 22 for rotationally driving the optical disc 205 housed within the disc cartridge 201 loaded on the cartridge loading unit 6 and a disc table 23 for loading the optical disc 205 thereon, as shown in FIG. 8.

The spindle motor 22 includes a stator coil and a rotor magnet facing each other in the direction of the rotational axis thereof and is comprised of a planar motor of a reduced thickness in a direction along its rotational axis. The spindle motor 22 is mounted with an upper end of a housing 29 making up a main motor body portion facing a cut-out 25 for mounting the motor formed in the base 3 and with a mounting piece 26 formed upright on the outer periphery of the housing 29 secured by a set screw 27 on the base 3, as shown in FIGS. 7 and 8.

The disc table 23 is mounted on a rotary shaft 24 of the spindle motor 22 on the side of the cartridge loading unit 6. This disc table 23 is sized so as to be large enough to support the non-signal-recording area around the center aperture 208 of the optical disc 205, and includes a magnet at a mid portion of a disc setting surface for the optical disc 205 for attracting the metallic plate 210 mounted on the optical disc 205. On the disc table 23 is arranged a centering member 28, as shown in FIG. 8. The centering member 28 is mounted on the disc setting portion of the disc table 23 for reciprocation along the rotary shaft 24 by being biased upwards by biasing means, such as a coil spring, not shown, so that, when the optical disc 205 is set on the disc table 23, the centering member 28 is reciprocated, that is moved in the up-and-down direction, as it is engaged in the center aperture 208, for centering the center of rotation of the optical disc 205 with respect to the center of rotation of the disc table 23.

On the lower surface side of the base 3 is mounted an optical pickup device 31 as shown in FIGS. 6 and 7. The optical pickup device 31 is configured for reading out information signals, such as musical sound signals, recorded on the optical disc 205 rotated in unison with the disc table 23.

The optical pickup device 31 includes an objective lens driving unit 33 and an optical block having a semiconductor laser 41 for radiating a light beam on the optical disc 205 and a photodetector 35 for receiving the return light reflected from the optical disc 205. The information signals, recorded on the optical disc 205, focusing error signals and the tracking error signals, are generated on the basis of an output of the photodetector 35.

The objective lens driving device 33 constituting the optical pickup device 31 is configured so that a bobbin, not shown, mounting the objective lens 32, is supported on one ends of four resilient supporting members 37 extending in a direction at right angles with the optical axis of the objective lens 32, that is in a tangential direction of the optical disc 205, for supporting the objective lens 32 along the optical axis and in a plane perpendicular to the optical axis or to the focusing direction, as shown in FIGS. 6 and 7. The objective lens driving device 33 includes an electromagnetic driving unit having a driving coil and a magnet. The driving current corresponding to the focusing error signal or the tracking error signal detected by the photodetector 35 is suppled to the driving coil of the electromagnetic driving unit for moving the objective lens 32 in the focusing direction and in the tracking direction for performing focusing control and tracking control of the light beam with respect to the optical disc 205.

The objective lens driving unit 33 is mounted on a mounting substrate 38 by having a stationary portion 39 supporting the opposite side end of the resilient supporting member 37 secured to the mounting substrate 38. The mounting substrate 38 is fed by a feed unit of the optical pickup unit 31, as will be explained subsequently.

The mounting substrate 38, on which is mounted the objective lens driving unit 33, also mounts an objective block 36. On one end of the mounting substrate 38 is mounted a semiconductor laser 41 for radiating a light beam illuminating the optical disc 205 via objective lens 32. This semiconductor laser 41 is mounted on the mounting substrate 38 so that the light beam radiated therefrom has its optical axis lying at right angles with the optical axis of the objective lens 32. On the mounting substrate 38 is mounted a reflective mirror 42 for bending the light beam outgoing from the semiconductor laser 41 by 90° and for directing the resulting light beam to the objective lens 32. The reflective mirror 42 is disposed below the objective lens 32 and is mounted on the mounting substrate 38 so that the center of the reflective surface thereof is coincident with the optical axis of the objective lens 32.

Figure 9:
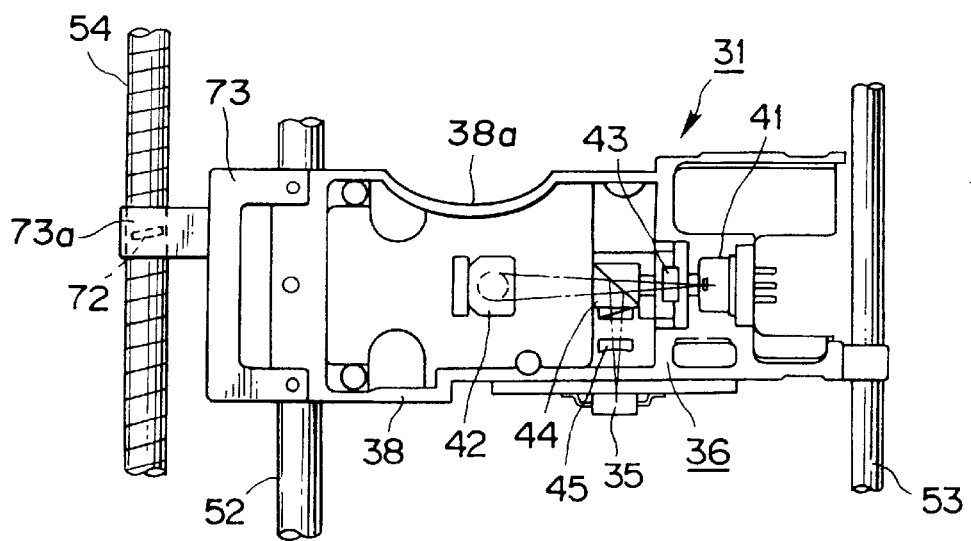
FIG. 9 is a bottom view of the optical pickup device showing an optical block.
Figure 10:
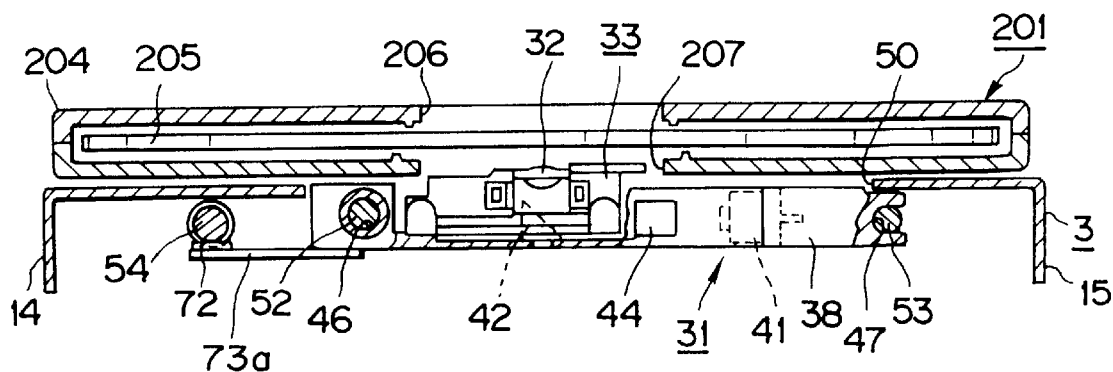
FIG. 10 is a cross-sectional view showing the state of mounting the optical pickup device to a base.

On the mounting base 38 is arranged a grating 43 for facing the outgoing surface of the semiconductor laser 41, as shown in FIGS. 9 and 10. A beam splitter 44 is arranged between the grating 43 and the reflective mirror 42. This beam splitter 44 is similar to, for example, a polarizing beam splitter, and is configured for separating and reflecting a return light beam of a light beam radiated from the semiconductor laser 41 and incident thereon via objective lens 32. The return light beam incident on the beam splitter 44 is taken out from the beam splitter 44 by bending the light path, that is the optical axis, of the return light beam by 90° relative to the optical axis of the incident light beam outgoing from the semiconductor laser 41. On one side of the mounting substrate 38 is mounted the above-mentioned photodetector 35 configured for detecting the return light beam separated by the beam splitter 44 for detecting the information signals recorded on the optical disc, focusing error signals or tracking error signals. This photodetector 35 is mounted with its light receiving surface facing the optical axis of the return beam split by the bean splitter 44. Between the beam splitter 44 and the photodetector 35 is mounted, via mounting substrate 38, a multiple lens 45 configured for shaping the return beam separated by the beam splitter 44.

On one side of the mounting base 38 is mounted a bearing 46 into which is inserted a feed guide shaft 52 constituting a feed mechanism 51 of the optical pickup device 31, as shown in FIGS. 6 and 7. On the opposite side of the mounting substrate 38 is mounted a guide supporting portion 47 which is U-shaped in cross-section and which is supported in position by being fitted in a supporting guide shaft 53 constituting the feed unit 51.

The semiconductor laser 41, reflective mirror 42, beam splitter 44 and the photodetector 35 receiving the return light beam from the optical disc, making up the optical block 36 arranged on the mounting substrate 38 of the above-described optical pickup device 31, are arranged within a plane parallel to the optical axis of the light beam extending from the semiconductor laser 41 as far as the reflective mirror 42, as shown in FIG. 10. The plane parallel to the optical axis of the light beam extending from the semiconductor laser 41 as far as the reflective mirror 42 is a plane parallel to the surface of the optical disc 205 loaded on the disc table 23.

By mounting optical components, such as the semiconductor laser 41 or the beam splitter 44, making up the optical block 36, on the mounting substrate 38, the optical pickup device 31 can be reduced in thickness.

Figure 11:
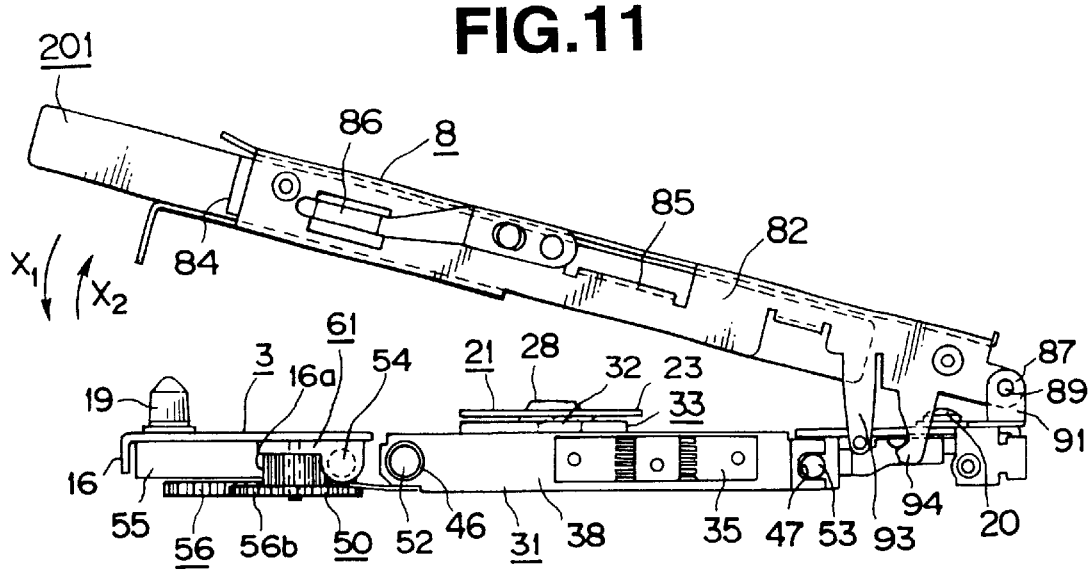
FIG. 11 is a side view showing the state in which a cartridge holder has been mounted on the base.

Since the reflective mirror 42 is located below the objective lens driving device 33, while the respective optical components are arranged within a plane parallel to the optical axis of the light beam proceeding from the semiconductor laser 41 as far as the reflective mirror 42, the objective lens driving device 33 is arranged above the optical unit 36 arranged on the mounting substrate 38, such that the objective lens driving device 33 is protruded from the entire optical pickup device 31 in a direction parallel to the optical axis of the objective lens 32. Since only the objective lens driving device 33 is protruded upwards, this optical pickup device 31 can be mounted for movement on the base 3 with the objective lens driving device 33 being introduced into the recording and/or reproducing aperture 207 in the disc cartridge 201 loaded on the cartridge loading unit 6 of the objective lens driving device 33, as shown in FIG. 11. The optical pickup device 31 is inserted at this time in a cut-out 50 formed as a substantially rectangular opening in the base 3, and is mounted for extending from the bottom surface to the upper surface of the base 3, as shown in FIG. 10.

On the base 3 is mounted the feed unit 51 configured for feeding the optical pickup device 31 along the radius of the optical disc 205 loaded on the disc table 23, as shown in FIGS. 6 and 7. This feed unit 51 is made up of a feed guide shaft 52 and a supporting guide shaft 53, mounted parallel to each other, a feed screw 54 for feeding the optical pickup device 31 along the radius of the optical disc 205, a feed motor 55 for rotationally driving the feed screw 54 and a driving force transmitting gear 56 for transmitting the driving power of the feed motor 55 to the feed screw 54. The feed guide shaft 52 and the supporting guide shaft 53 are configured for guiding the optical pickup device 31 parallel to the radius of the optical disc 205.

The feed guide shaft 52 and the supporting guide shaft 53 are positioned on both sides of the apertures 206, 207 of the disc cartridge 201 loaded on the cartridge loading unit 6 and arranged in this position on the bottom surface of the base 3 parallel to the radius of the optical disc 205 loaded on the disc table 23. The feed guide shaft 52 has its one end fitted in a fitting hole 57 bored in a sidewall section 15 of the base 3, while having its opposite end supported by a supporting member 58 mounted on the bottom surface of the base 3.

The feed screw 54 is rotatably supported by a screw mounting member 61 by which it is mounted on the bottom surface of the base 3 parallel to the feed guide shaft 52 and the supporting guide shaft 53. The screw mounting member 61 is comprised of a mounting portion 61a to the base 4 having supporting pieces 62, 63 on both ends of a lateral side thereof between which is rotatably supported a feed screw 54, as shown in FIG. 5. The screw mounting member 61 is mounted on the bottom side of the base 3 by set screws 64 mounted on the mounting portion 61a. The feed screw 54 is mounted on the screw mounting member 61 by having shafts 54a, 54b on one end and an intermediate portion thereof inserted through and supported by supporting pieces 62, 63. The opposite end of the feed screw 54 carries a worm gear 65 engaging with the drive force transmission gear 56.

The drive force transmission gear 56 is made up of a small-diameter bevel gear 56a and a large-diameter bevel gear 56b mounted coaxially with each other. The drive force transmission gear 56 is mounted for rotation on a pivot 66 set on the bottom surface of the base 3 by having the bevel gear 56a engaged with the worm gear 65 of the feed screw 54.

The feed motor 55, configured for rotating the feed screw 54, is a planar motor of a reduced thickness made up of a stator coil and a rotor magnet arranged facing each other in the direction of its rotational shaft 67. This feed motor 55 is mounted on the base 3 with the rotational shaft 67 directing downwards, as shown in FIG. 8. At this time, the feed motor 55 is mounted on the bottom surface of the base 3 so that the proximal side of the housing 69 of the main motor body portion is fitted into a cut-out motor-mounting opening 68 and so that a proximal surface 69a of the housing 69 will be substantially flush with the upper surface of the cartridge loading unit 6 of the base 3. The feed motor 55 is mounted on the base 3 by securing mounting pieces 70 formed protuberantly on the rim of the housing 69 by set screws 71. By using a planar motor of a reduced thickness as the feed motor, and by mounting the feed motor 55 with the proximal'surface of the housing 69 fitted into the base 3, the player unit 2 can be reduced in thickness.

The distal end of the rotational shaft 67 of the feed motor 55 carries a spur gear 72 meshing with a spur gear 56b of the driving power transmission gear 56. When the feed motor 55 is run in rotation, the driving power is transmitted via driving power transmission gear 56 for running the feed screw 54 in rotation.

The optical pickup device 31 is mounted on the base 3 by having the feed guide shaft 52 passed through the bearing 46 and by having a guide supporting portion 47 supported by a supporting shaft 53, as shown in FIGS. 6 and 7.

The base 3 is formed with a substantially rectangular cut-out 50 extending throughout the extent of movement of the optical pickup device 31, as shown in FIGS. 6 and 7. The cut-out 50 operates for directly facing the optical pickup device 31 arranged on the bottom side of the base 3 to the optical disc 205 loaded on the disc table 23 and for allowing the objective lens driving device 33 to be protruded towards the cartridge loading unit 6.

The objective lens driving device 33 is arranged so that, when the optical pickup device 31 is mounted on the base 3, the resilient supporting members 37 will be directed in a tangential direction of a recording track formed on the optical disc 205 loaded on the disc table 23 (tangential direction), as shown in FIG. 6. The objective lens driving device 33 is arranged on the base 3 with the longitudinal direction as the tangential direction. The optical block 36 is arranged so that the optical axis proceeding from the semiconductor laser 41 to the reflective mirror 42 will be parallel to the above-defined tangential direction.

The optical pickup device 31 is mounted on the base 3 at such a height level that the objective lens driving device 33 mounted on the mounting substrate 38 can be inserted into the recording/reproducing aperture 207 formed in the lower surface of the disc cartridge 201 loaded on the cartridge loading unit 6, as shown in FIG. 6. The optical pickup device 31 is mounted on the base 3 at such a height level that, when the disc cartridge 201 is loaded in position on the disc cartridge 201, with the optical disc 205 is centered by the centering member 28 with respect to the disc table 23 and clamped under this condition, the objective lens driving device 33 can be inserted into the recording/reproducing aperture 207 bored in the lower surface of the disc cartridge 201. The optical pickup device 31 is mounted at such a spacing that, even if the objective lens 32 is driven and moved in the focusing direction parallel to the optical axis, the objective lens 32 will not be contacted with the optical disc 205. Stated differently, the optical pickup device 31 is mounted on the base 3 so that, when the objective lens 32 is driven in the focusing direction, whilst the objective lens driving device 33 is introduced into the recording/reproducing aperture 207 bored in the lower surface of the disc cartridge 201 loaded on the cartridge loading unit 6, the feed guide shaft 52 and the supporting guide shaft 53 will be at such a height as not to be contacted with the surface of the optical disc 205.

By arranging the optical pickup device 31 on the base 3 in this manner, it becomes possible to reduce the distance between the objective lens 32 and the optical disc 205, thus reducing the size and weight of the objective lens 32 and hence the size of the objective lens driving device 33.

Meanwhile, the optical pickup device 31 is connected to the feed screw 54 via an engagement pin 72 provided on one side thereof provided with the bearing 46 supported by the feed guide shaft 52, as shown in FIGS. 6 and 7. This engagement pin 72 is mounted on a distal end 73a of a spring plate 54 protuberantly mounted on one end of the mounting base 38 and is pressed into engagement with a valley of the feed screw 54 under the bias of the spring plate 73 for connecting the optical pickup device 31 to the feed screw 54. The feed motor 55 is run in rotation so that the feed screw 54 is rotated via the driving force transmitting gear 56 so that the engagement pin 72 is moved by being guided by the valley of the feed screw 54. This causes the optical pickup device 31 to be moved across the inner and outer rims of the optical disc 205, as indicated by arrows Y1 and Y2 in FIG. 6, by being guided by the feed guide shaft 52 and the supporting guide shaft 53.

When the optical pickup device 31 is mounted on the base 3, a recessed portion 38a extending along the disc rotation driving unit 21 is formed on the opposite lateral side thereof facing the disc rotation driving unit 21, as shown in FIGS. 6 and 7. This recessed portion 38a enables the light beam to scan the optical disc 205 loaded on the disc table 23 as far as the innermost recording area of the optical disc 205 without the optical pickup device 31 being abutted against the disc rotation driving unit 21. By providing this recessed portion 38a, it becomes possible to use a spindle motor 22 of a larger size of the disc rotation driving unit 21 for realizing stable rotation of the optical disc 205.

On the bottom surface of the base 3, there is mounted a printed circuit board 75 carrying a variety or electronic circuits, such as a playback processing circuit for converting information signals recorded on the optical disc 205 and outputted by the optical pickup device 31, a control circuit for outputting focusing or tracking error signals, and a motor driving circuit for driving the spindle motor 22 or the feed motor 25. The printed circuit board carries a variety of electronic circuit components, such as integrated circuit elements constituting the playback processing circuit, control circuit or the motor driving circuit, as shown in FIG. 5. These electronic components 76 are large-sized components protruded significantly from the surface of the printed circuit board 75.

The base 3 is formed with a cut-out 77 operating as an opening in register with the electronic components 76 mounted on the printed circuit board 75. The printed circuit board 75 is mounted by a set screw 78 on the bottom side of the base 3 with the electronic components 76 being fitted into the cut-out 77. Since the printed circuit board 75 is mounted with the large-sized electronic components 76 of large height fitted into the cut-out 77 formed in the base 3, the player unit 2 can be reduced in thickness.

The cut-out 77, into which are fitted the electronic components 76, is at an intermediate position between the disc table 23 of the disc rotation driving unit 21 mounted on the base 3 and the back surface of the base 3 rotatably supporting the proximal side of the cartridge holder 8, as will be explained subsequently. Since the spacing between the back side of the base 3 and the disc table 23 is not opened significantly even if the lid is rotated in synchronism with the cartridge holder 8, there is no risk of the electronic components 76 facing the upper surface of the base 3 being contacted by the intruding hand or finger of the user, so that it becomes possible to protect the electronic components 76.

Meanwhile, the printed circuit board 76 is mounted on the bottom surface of the base 3 for preventing the electronic components 76 fitted in the cut-out 77 from being protruded significantly towards the cartridge loading unit 6 for obstructing loading of the disc cartridge 201.

The printed circuit board 76 carries, in addition to the above-mentioned plural electronic components, a position detection switch 79 and a connector 80b for connection to an earphone jack 80a and a connector 80b for connection to external devices. The position detection switch 79 detects that the optical pickup device 31 is fed by the feed motor 55 and thereby moved to the innermost rim of the disc rotation driving unit 21 in order to start the playback operation.

On the upper surface of the base 3, that is the base surface carrying the disc rotation driving unit 21, the optical pickup device 31 and the printed circuit board 76 for completing the player unit 2, as described above, there is mounted the cartridge holder 8 rotated in synchronism with the lid 7 for loading or unloading the disc cartridge 201 on or from the cartridge loading unit 6, as shown in FIG. 11. This cartridge holder 8 is formed with a major surface 81 substantially coextensive as the planar shape of the disc cartridge 201 and cartridge holders 82, 83 of U-shaped cross-section for supporting the front and back sides of the disc cartridge 201 on both opposite lateral sides of the major surface 81, as shown in FIG. 5. The cartridge holder 8 also has the opened front side, extending at right angles with the sides thereof formed with the holders 82, 83, as an insertion/ejection aperture 84 for the disc cartridge 201. The lateral side of the cartridge holder 82 is formed with a shutter opening piece 85 for engaging with the front side of the disc cartridge 201 inserted into the cartridge holder 8 via an insertion/ejection aperture 84 for opening the shutter 211. On the lateral side of the cartridge holder 82 is formed a shutter closing member 86 engaged in an engagement opening 215 in the shutter 211 for closing the shutter 211 when the disc cartridge 211 is ejected from the cartridge holder 8.

By pivoting supporting shafts 89, 89 set upright on lugs 87, 88 protuberantly formed on both sides of the proximal side of the cartridge holder 8 opposite to the front side formed with the insertion/ejection aperture 84, by a pair of pivots 91, 92 provided on both sides on the back surface of the base 3, the cartridge holder 8 can be mounted in position for rotation in a direction towards the cartridge loading unit 6, as indicated by arrow X1 in FIG. 11, or in a direction away from the cartridge loading unit 6, as indicated by arrow X2 in FIG. 12, about the supporting shafts 89, 90 as the center.

On a lateral side towards the proximal side of the cartridge holder 8, there are provided a rotation restricting piece 93 for restricting the range of rotation entered about the supporting shafts 89, 90 and an engagement arm 94 associated with a portion of the lid 7.

The cartridge holder 8 is mounted on the base 3 for being rotated in a direction at right angles with the movement direction of the optical pickup device 31 mounted on the base 3, as shown n FIGS. 2 and 5. By mounting the cartridge holder 8 in this manner, the disc cartridge 201 can be loaded without being affected by the movement position of the optical pickup device 31. Since the relative position between the rotated cartridge holder 8 and the optical pickup 31 remains constant without regard to the prevailing position of movement of the optical pickup 31, the disc cartridge 201 can be loaded and unloaded reliably.

With the above-described disc player according to the present invention, in which the disc cartridge 201 having housed therein the optical disc 205 with a diameter of approximately 64 mm is used as a recording medium, a portion of the spindle motor 22 is caused to face the base 3 of the player unit 2, the optical pickup device 31 is mounted on the base 3 with the objective lens driving unit 33 being inserted into the disc cartridge 201 loaded on the cartridge loading unit 6, and in which the printed circuit board is mounted on the base 3 with the mounted electronic components 76 being fitted in the base 3, it becomes possible to realize the thickness D3 not more than 14 mm, the width W3 of not more than 78 mm and the depth L3 of not more than 100 mm, as shown in FIG. 1.

Although the foregoing description has been made of a read-only disc player, the present invention may similarly be applied to a disc recording/reproducing apparatus capable of recording/reproducing information signals. If the present invention is applied to a disc recording/reproducing apparatus, a magnetic head for impressing an external magnetic field is mounted facing the optical pickup device 31. This magnetic head is connected to the optical pickup device 31 so as to be moved in synchronism with the optical pickup device 31 and is provided for being extended towards the cartridge loading unit 6. If the present invention is applied to this recording/reproducing type apparatus, the apparatus is increased in thickness by an amount corresponding to the spacing for accommodating the magnetic head.

What is claimed is:

1. A disc reproducing apparatus employing a disc cartridge having housed therein a disc having a diameter of approximately 64 mm, said disc cartridge having an aperture for exposing the disc, said disc reproducing apparatus further comprising:
    a main casing body portion having a longer side and a shorter side;
    a casing base provided on said main casing body portion as a metallic plate, the casing base having a cut-out of substantially the same size as the aperture in the disc cartridge;
    a cartridge holder configured to hold the disc cartridge and coupled to an upper surface of said casing base by a cartridge holder support configured to provide a rotational axis parallel to the shorter side of the main casing body portion around which said cartridge holder is configured to rotate to place the cartridge holder in a first position spaced apart from the upper surface and in a second position next to said upper surface;
    a casing lid coupled to the upper surface by a casing lid support configured to provide a rotational axis parallel to the shorter side of the main casing body portion around which the casing lid is configured to rotate said casing lid being configured to rotate with said cartridge holder;
    a spindle motor having a rotational shaft extending therefrom, with a portion of said spindle motor being fitted into and attached to said casing base
    a rotational driving unit having a disc table configured to be protruded from the upper surface of said casing base with the disc in said disc cartridge held by said cartridge holder being set on said disc table when said cartridge holder is in said second position, the rotational shaft of the spindle motor being coupled to the disc table to rotationally drive the disc table;
    a pickup feed motor configured to be fitted into and attached to said casing base, said pickup feed motor having a rotational shaft extending therefrom in a direction substantially parallel to a direction of extension of the rotational shaft of said spindle motor; and
    a feed unit arranged on said opposite surface of the casing base including a feed screw coupled to the rotational shaft of the feed motor and a pickup having at least a pickup portion extending into said cut-out in said casing base, with rotation of the rotational shaft of the feed motor driving the lead screw coupled thereto to move the pickup portion in said cut-out along a radial disc direction,
    wherein said pickup has a light source, an objective lens for condensing a light beam from said light source on to the disc and an actuator for driving said objective lens, said actuator being included in the pickup portion that is intruded via said cut-out in the casing base into the aperture in said disc cartridge when said cartridge holder is in said second position.

2. The disc reproducing apparatus as claimed in claim 1, with the outer size inclusive of the main casing body portion and said casing lid with the cartridge holder being in said second position being not more than 14 mm in thickness, not more than 78 mm in width, and not more than 100 mm in depth.

3. The disc reproducing apparatus as claimed in claim 2, wherein said main casing body portion has a cell container configured to house a battery cell and to rotatably mount a cell lid configured to open and close an opening formed in a wall of said cell container parallel to the longer side of the main casing body portion, said cell lid being configured to be rotatably mounted relative to a rotation axis parallel to the longer side of the main casing body portion.

4. The disc reproducing apparatus as claimed in claim 1, wherein said pickup feed motor is configured to be fitted into said casing base by being inserted into a further cut-out formed in and extending through said casing base.

5. The disc reproducing apparatus as claimed in claim 1, wherein said feed unit includes a spur gear connected to a first gear mounted on the rotational shaft of said pickup feed motor and a bevel gear configured to be rotated in unison with the spur gear and adapted to be meshed with a worm gear mounted on an end portion of said feed screw.

6. The disc reproducing apparatus as claimed in claim 1, further comprising a printed circuit board configured to mount electronic components, said printed circuit board being mounted between said main casing body portion and said opposite surface of said casing base.

7. The disc reproducing apparatus as claimed in claim 6, wherein said casing base has a further cut-out and wherein the electronic components are mounted and arranged on said printed circuit board so as to project through said further cut-out.

8. The disc reproducing apparatus as claimed in claim 2, wherein said main casing body portion has a cell container configured to house a battery cell and to rotatably mount a cell lid configured to open and close an opening formed in a wall of said cell container parallel to the longer side of the main casing body portion, said cell lid being configured to be rotatably mounted relative to a rotation axis parallel to the longer side of the main casing body portion.

9. A disc recording and/or reproducing apparatus employing a disc cartridge having housed therein a disc, said disc cartridge having an aperture for exposing the disc, said disc recording and/or reproducing apparatus further comprising:

a main casing body portion having a longer side and a shorter side;

a casing base provided on said main casing body portion, the casing base as a metallic plate having a cut-out of substantially the same size as the aperture in the disc cartridge;

a cartridge holder configured to hold the disc cartridge and coupled to an upper surface of said casing base by a cartridge holder support configured to provide a rotational axis parallel to the shorter side of the main casing body portion around which said cartridge holder is configured to rotate to place the cartridge holder in a first position spaced apart from the upper surface and in a second position next to said upper surface;

a casing lid coupled to the upper surface by a casing lid support configured to provide a rotational axis parallel to the shorter side of the main casing body portion around which the casing lid is configured to rotate said casing lid being configured to rotate with said cartridge holder;

a spindle motor having a rotational shaft extending therefrom, with a portion of said spindle motor being fitted into and attached to said casing base;

a rotational driving unit having a disc table configured to be protruded from the upper surface of said casing base with the disc in said disc cartridge held by said cartridge holder being set on said disc table when said cartridge holder is in said second position, the rotational shaft of the spindle motor being coupled to the disc table to rotationally drive the disc table;

a pickup feed motor configured to be fitted into and attached to said casing base, said pickup feed motor having a rotational shaft extending therefrom in a direction substantially parallel to a direction of extension of the rotational shaft of said spindle motor; and a feed unit arranged on said opposite surface of the casing base including a feed screw coupled to the rotational shaft of the feed motor and a pickup having at least a pickup portion extending into said cut-out in said casing base, with rotation of the rotational shaft of the feed motor driving the lead screw coupled thereto to move said pickup portion in said cut-out along a radial disc direction, wherein said pickup has a light source, an objective lens for condensing a light beam from said light source on to the disc and an actuator for driving said objective lens, said actuator being included in the pickup portion that is intruded via said cut-out in the casing base into the aperture in said disc cartridge when said cartridge holder is in said second position.

10. The disc recording and/or reproducing apparatus as claimed in claim 9, wherein said pickup feed motor is configured to be fitted into said casing base by being inserted into a further cut-out formed in and extending through said casing base.

11. The disc recording and/or reproducing apparatus as claimed in claim 9, wherein said feed unit includes a spur gear connected to a first gear mounted on the rotational shaft of said pickup feed motor and a bevel gear configured to be rotated in unison with the spur gear and adapted to be meshed with a worm gear mounted on an end portion of said feed screw.

12. The disc recording and/or reproducing apparatus as claimed in claim 9, further comprising a printed circuit board configured to mount electronic components, said printed circuit board being mounted between said main casing body portion and said opposite surface of said casing base.

13. The disc recording and/or reproducing apparatus as claimed in claim 12, wherein said casing base has a further cut-out and wherein the electronic components are mounted and arranged on said printed circuit board so as to project through said further cut-out.

* * * * *